United States Patent [19]

Khavkin

[11] Patent Number: 5,082,306
[45] Date of Patent: Jan. 21, 1992

[54] VEHICLE SUSPENSION SYSTEM PROVIDING CONTINUOUS VERTICAL ORIENTATION OF THE GROUND WHEEL

[76] Inventor: Boris Khavkin, 5 Beeston Drive, Winnipeg, Manitoba, Canada, R2V 3E9

[21] Appl. No.: 586,211

[22] Filed: Sep. 21, 1990

[51] Int. Cl.⁵ .............................................. B62D 17/00
[52] U.S. Cl. .................................... 280/661; 280/96.3
[58] Field of Search ...................... 280/661, 96.3, 675; 301/1, 5 R

[56] References Cited

U.S. PATENT DOCUMENTS

| | | | |
|---|---|---|---|
| 1,721,606 | 7/1929 | Sullenger | 280/96.3 |
| 2,173,737 | 9/1939 | Ulinski | 301/5 R |
| 2,987,322 | 6/1961 | Hutchens | 280/96.3 |
| 3,751,061 | 8/1973 | Scheuerpflug | 280/661 |
| 3,994,355 | 11/1976 | Rizzo | 301/1 X |
| 4,700,972 | 10/1987 | Young | 280/661 X |
| 4,854,603 | 8/1989 | Scaduto | 280/661 X |
| 4,927,169 | 5/1990 | Scaduto | 280/661 |

Primary Examiner—Charles A. Marmor
Assistant Examiner—Kevin Hurley
Attorney, Agent, or Firm—Adrian D. Battison; Stanley G. Ade; Murray E. Thrift

[57] ABSTRACT

A vehicle suspension system includes a modified wheel structure including an outer rim rotating upon an inner member formed substantially as a hollow cylindrical drum on an outer surface of which the rim is mounted on bearings provided between the outer surface and the inner surface of the rim. A suspension arm from the vehicle frame projects from the vehicle frame into the hollow drum for pivotal movement of the wheel relative to the suspension arm about a horizontal axis which lies substantially in the vertical central plane of the wheel. In a steering system, the suspension arm connects with a cap mounted on a post at the bottom of the inner member with a hydraulic motor driving rotation of the inner member relative to the cap for a steering action. The drive system to the wheel is transmitted through an open inner face of the drum through a hole in an outer face of the drum to a drive disc mounted on the outer face and communicating radially outwardly to the outwardly facing edge of the rim member. The suspension system does not require any cantilever effect and allows a central plane of the wheel to remain vertical at all times.

19 Claims, 4 Drawing Sheets

VEHICLE SUSPENSION SYSTEM PROVIDING CONTINUOUS VERTICAL ORIENTATION OF THE GROUND WHEEL

BACKGROUND OF THE INVENTION

This invention relates to a vehicle suspension system designed to provide continuous vertical orientation of the central plane of the ground wheel while the suspension allows the wheel to move vertically relative to the frame of the vehicle.

Conventional suspension systems particularly for the front wheels of a road vehicle generally provide a suspension arm pivotally mounted on a suitable frame member at a position inwardly of the wheel towards a centre line of the vehicle. At an outer end of the pivot arm is provided a wheel support or coupling member with the wheel being carried on a cantilever arm which extends outwardly from the coupling member into the hub of the wheel and providing a shaft carrying bearings on which the wheel is mounted for rotation around the wheel axis.

In many cases, pivotal movement of the suspension arm causes the wheel axis to pivot so that a central plane of the wheel no longer remains vertical but twists about an axis longitudinal to the forward movement of the vehicle, thus changing the camber angle of the wheel.

In order to steer the wheel it is generally necessary to provide ball joints which allow the cantilevered shaft to pivot about a substantially vertical axis positioned inwardly of the wheel toward the centre line of the vehicle. This pivot action causes the wheel to move forwardly and rearwardly in the steering action and causes significant changes within the vehicle geometry as the steering takes place.

As the movement of the suspension changes the orientation of the central plane of the wheel, it also changes the orientation of the periphery of the tire relative to the horizontal surface of the ground. The tire therefore must deform to maintain as much flat surface of tire on the ground as possible while the angle of the rim supporting the tire varies. Attention has been given in recent years to reducing the profile of the tire but this is limited by the fact that the tire must have sufficient ability to deform to accomodate these changes in angle of the rim relative to the ground.

The steering and suspension system in the conventional system is relatively complex and must be manufactured using relatively heavy components in view of the significant forces involved in the cantilever support arrangement.

The geometry of the steering suspension system also provides complication in the alignment so that careful checking of the alignment is necessary and in the event that the alignment is disturbed, this can rapidly lead to damage to the tires.

The conventional steering and suspension geometry has therefore all of the above problems and yet remains substantially unaltered after many years of development.

Racing cars often use a somewhat different suspension system which attempts more vigorously to retain the periphery of the tire permanently horizontal in view of the fact that the traction between the tire and the ground is significantly more important during racing. The suspension system therefore includes often a parallelogram type linkage so that the wheel hub mounted inside the drum type rim stays substantially vertical while moving upwardly and downwardly in the suspension action. This system however provides a very limited amount of suspension movement which is suitable for racing vehicles but is not suitable for conventional road vehicles where the roadway is less than perfect and the passengers expect more comfort.

SUMMARY OF THE INVENTION

It is one object of the present invention, therefore, to provide an improved suspension system for a motor vehicle.

According to a first aspect of the invention, therefore, there is provided a vehicle suspension system comprising a vehicle frame member, a ground wheel having a peripherally extending ground engaging tire, a wheel rim member on which the tire is mounted for rotation about a substantially horizontal axis of the wheel and defining a vertical central plane of the wheel lying radial to the axis and substantially midway across the width of the tire, an inner member, bearing means mounting the rim member on the inner member for rotation relative thereto about the wheel axis, a suspension arm, means pivotally mounting the arm on the frame member for pivotal movement about a horizontal axis allowing vertical movement of the ground wheel relative to the frame member, resilient suspension means resiliently supporting the arm against vertical movement in an upward direction and coupling means coupling an outer end of the arm to the inner member, said coupling means holding said inner member against rotation around the wheel axis, said coupling means and said inner member defining a pivot axis for pivotal movement of the arm relative to the inner member, said pivot axis being horizontal and lying in said central plane.

According to a second aspect of the invention, therefore, there is provided a vehicle suspension system comprising a vehicle frame member, a ground wheel having a peripherally extending ground engaging tire, a wheel rim member on which the tire is mounted for rotation about a substantially horizontal axis of the wheel, an inner member, bearing means mounting the rim member on the inner member for rotation relative thereto about the wheel axis, a suspension arm, means pivotally mounting the arm on the frame member for pivotal movement about a horizontal axis allowing vertical movement of the ground wheel relative to the frame member, resilient suspension means resiliently supporting the arm against vertical movement in an upward direction and coupling means coupling an outer end of the arm to the inner member, said coupling means holding said inner member against rotation around the wheel axis, wherein the inner member comprises a substantially cylindrical wall coaxially surrounding the wheel axis and located radially inwardly of and supporting the wheel rim, bearing means positioned radially outwardly of the cylindrical wall between the cylindrical wall and the wheel rim, the cylindrical wall surrounding the coupling means, said coupling means and said inner member defining a pivot axis for pivotal movement of the arm relative to the inner member, said pivot axis being horizontal and lying within said cylindrical wall.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
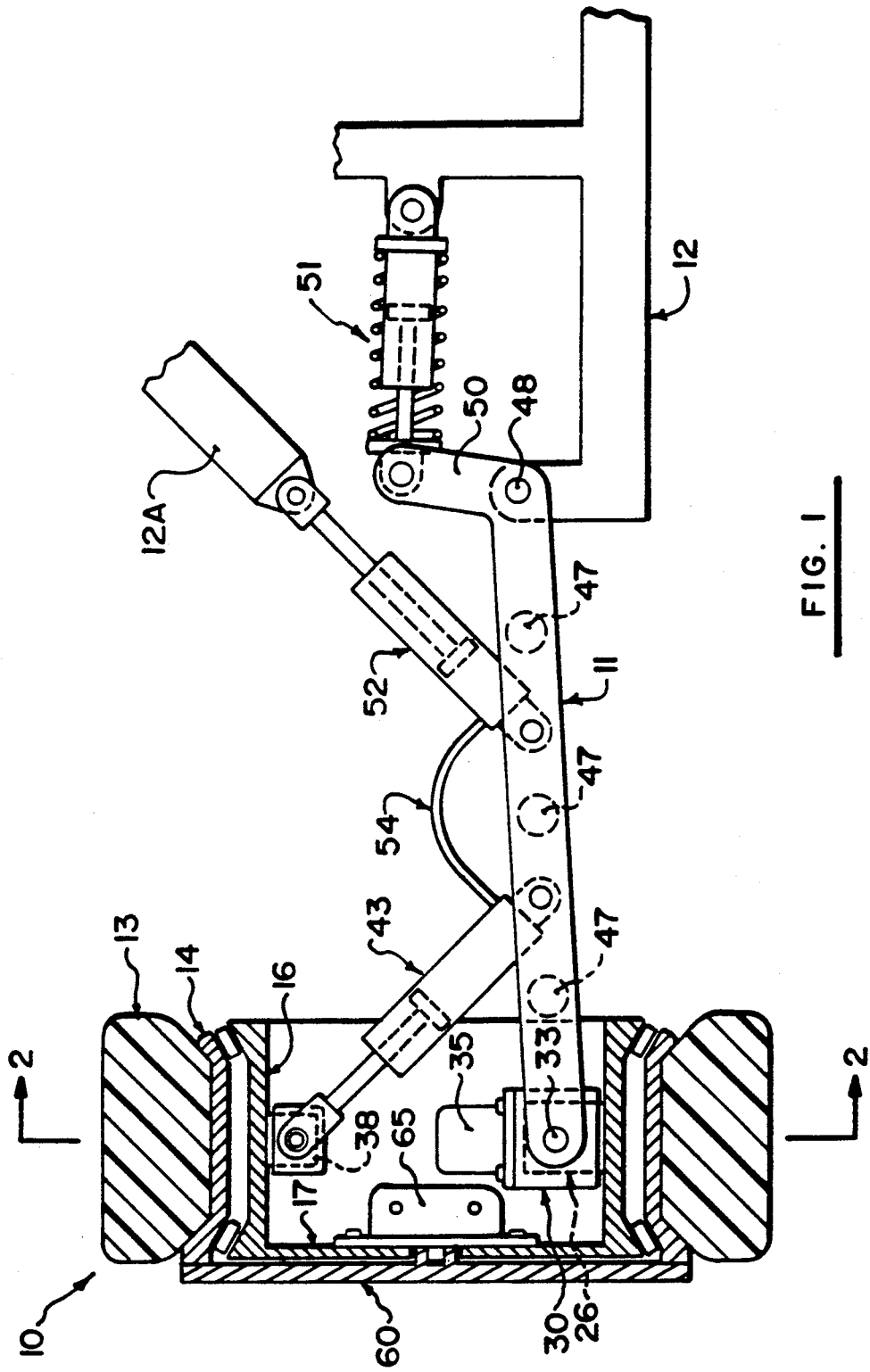
FIG. 1 is a vertical cross sectional view through a suspension system according to the present invention, the cross sectional view being taken along the lines 1—1 in FIG. 2.
Figure 2:
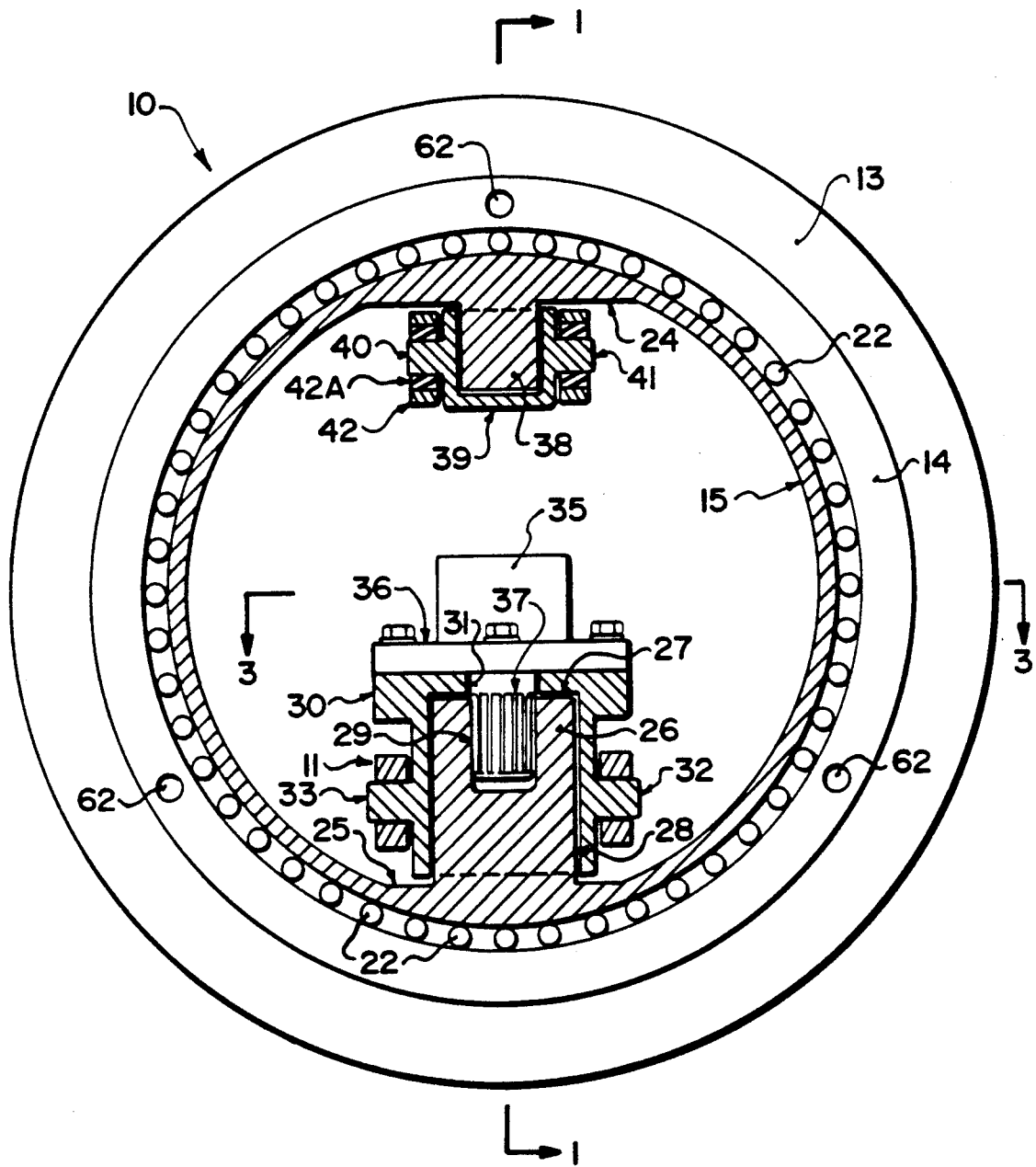
FIG. 2 is a part cross sectional part front elevational view taken along the lines 2—2 of FIG. 1.
Figure 3:
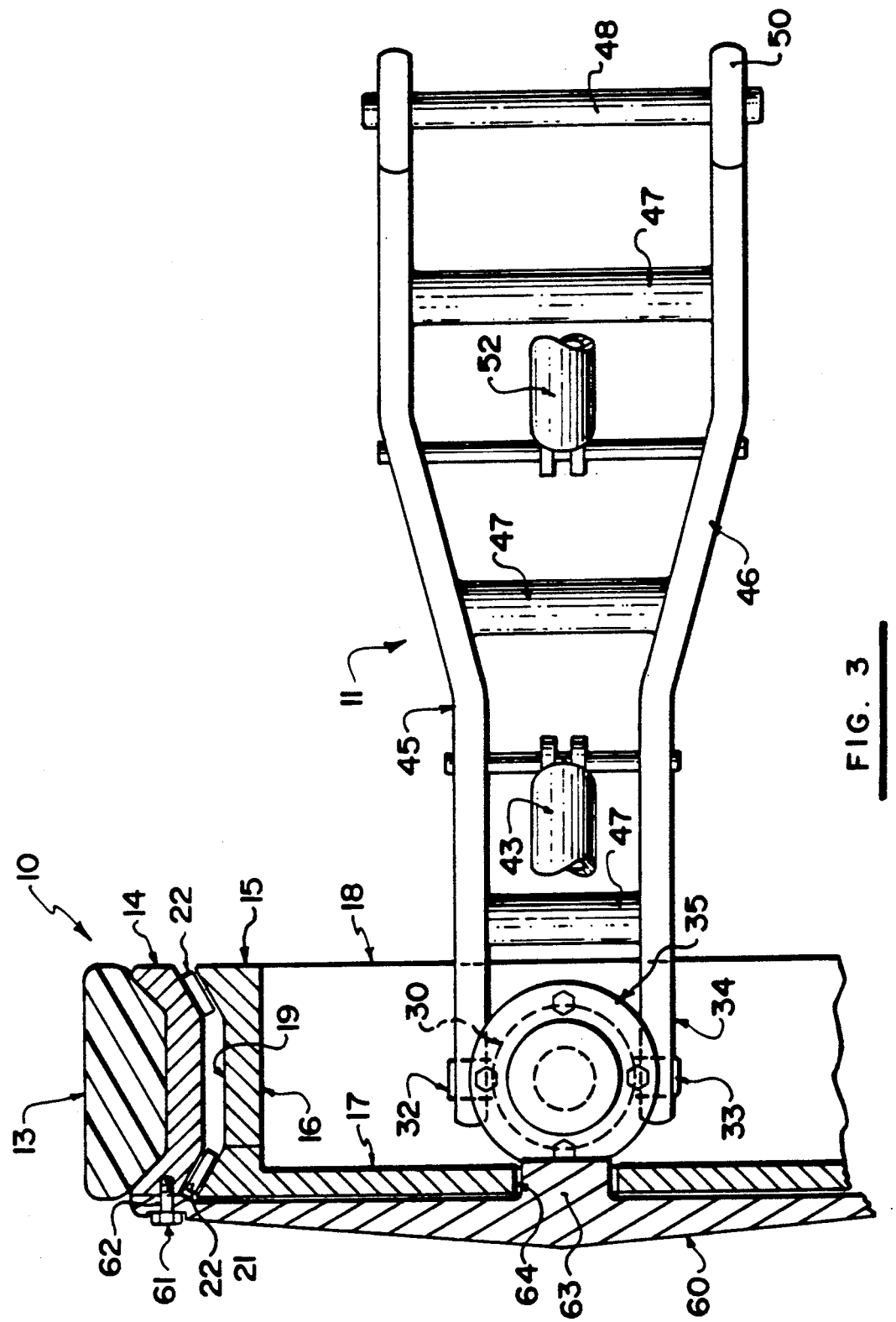
FIG. 3 is a cross sectional view taken along the lines 3—3 of FIG. 2.

Turning firstly to FIGS. 1, 2 and 3, a vehicle suspension system comprises a ground wheel generally indicated at 10 mounted upon a suspension arm 11 coupled to a vehicle frame member schematically indicated at 12.

The ground wheel 10 comprises a tire 13 mounted upon a rim member 14 carried for rotation about a wheel axis upon an inner member 15.

The inner member 15 comprises a substantially cylindrical ring 16 surrounding and coaxial with the wheel axis which is coupled to an outer end cap member 17 defining an end plate of the cylinder. The inner member is thus substantially cylindrical defining a hollow interior and with an open inner face 18 through which the suspension and drive systems can pass.

The outer face of the inner member is formed with a central cylindrical portion 19 and a pair of frusto conical portions 20 and 21 which increase in radial extent from the outer ends of the cylindrical portion towards the sides of the wheel. The frusto conical portions act as support elements for roller bearings 22 positioned between the outer surface of the cylindrical inner member and an inner surface of the rim member 14. Thus the rim member 14 is cooperatingly shaped with a central cylindrical portion and a pair of outer frusto conical portions tapering to match the shape of the outer surface of the inner member and to receive the bearings 22 therebetween. It will be noted that the outer frusto conical portion 21 is formed as a portion of the surface of the end plate 17 so that the end plate 17 can be removed by disconnecting bolts around the periphery of the end plate thus removing the bearings 22 and allowing the rim member 14 to slide axially off the outside surface of the inner member for removal of the wheel. However with the end cap replaced the wheel is maintained in proper position for rotation about the wheel axis and is supported effectively by the roller bearings 22 which are under little stress in view of the fact that there are relatively large number of the roller bearings and that there speed of revolution is significantly less than that of bearings positioned adjacent a central axle of a conventional wheel arrangement.

In normal rotation of the wheel about the wheel axle, therefore, the inner member remains stationary and the rotating mass is provided simply by the rim member 14 and the tire 13 thus reducing the mass of the rotating part of the wheel relative to a conventional wheel construction.

Fixed at the top and bottom respectively of the inner member is a platform 24 and 25 each of which defines a horizontal surface fixed within the inner member and formed integrally with the inner member for controlling the position of the inner member and thus the position of the wheel.

The lower platform 25 carries a post member 26 projecting vertically upwardly therefrom in the form of a cylindrical body having a flat upper surface 27 and a cylindrical peripheral surface 28. The post member has a splined bore 29 extending through the upper surface 27 in a vertical direction and including vertical splines arranged in a parallel arrangement around the surface thereof.

Upon the post is mounted a cap member 30 having a flat horizontal upper plate portion resting upon the upper surface 27 and a cylindrical sleeve portion surrounding and in contact with the surface 28 of the post member. The cap member 30 is therefore free to rotate about the vertical axis defined by the post member. The cap member has a central opening 31 aligned with the opening 29 in the top of the post member.

Figures 4, 5:
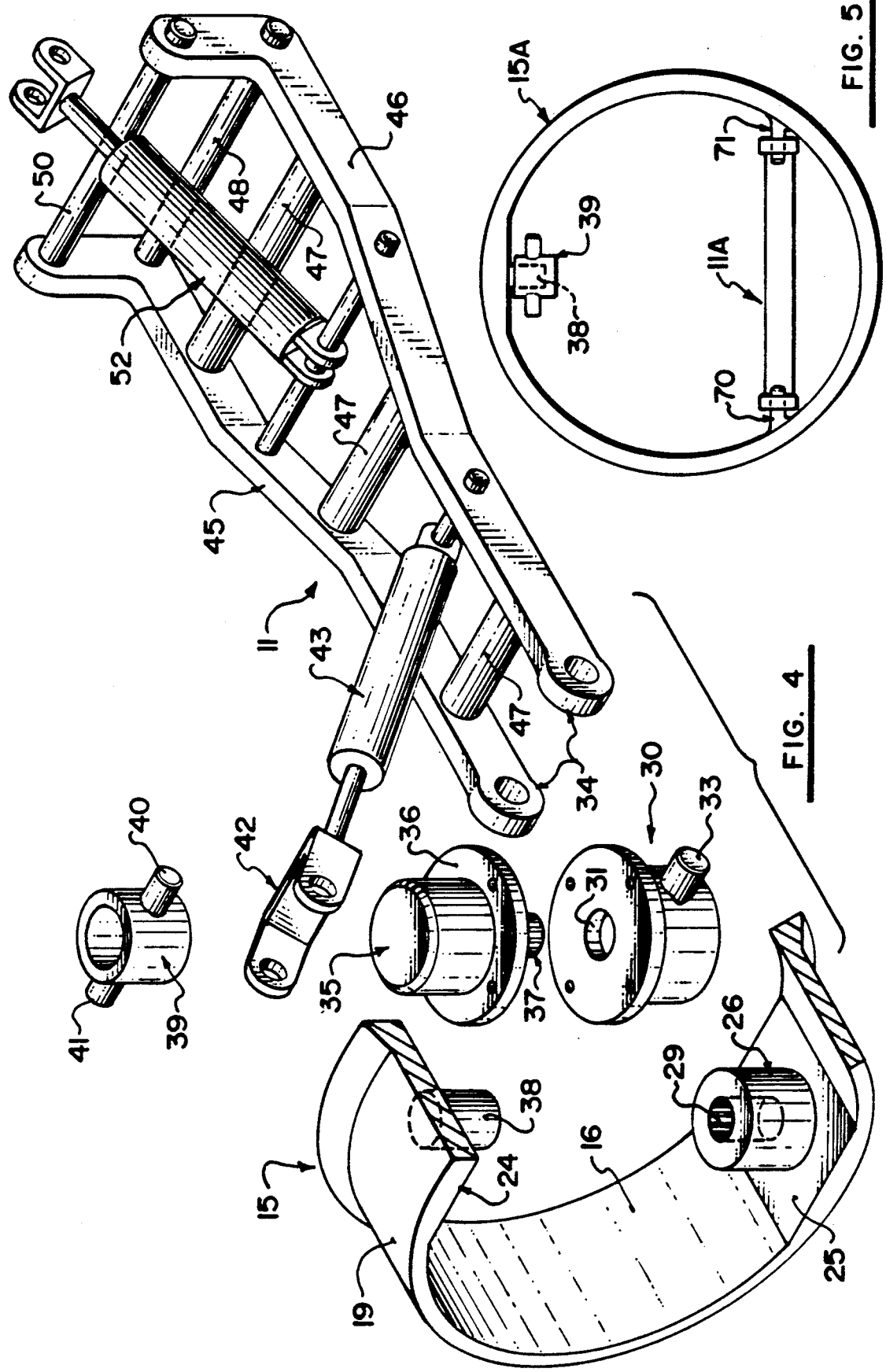
FIG. 4 is an exploded isometric view of the suspension system of FIG. 1.
FIG. 5 is a cross sectional view similar to that of FIG. 2 showing a modified arrangement suitable for use with a non-steering wheel of a vehicle.

The cap member 30 carries at diametrically opposed positions partway up the sleeve portion thereof a pair of pins 32 and 33 which project outwardly to the sides of the cap member. The pins define a pivot axis and cooperate with a clevis 34 at the outer end of the suspension arm 11 as best shown in FIG. 4.

The post member 26 is positioned exactly midway across the width of the inner member so that the vertical axis of the post lies on a central plane of the wheel at right angles to the wheel axis and passing through a midpoint of the tire 13. The pin 32 and 33 are positioned directly on either side of the post member 26 and thus similarly have an axis lying in the central plane and at right angles to the axis of the post member. The pivot action of the inner member relative to the outer end of the suspension arm 11 therefore takes place about a pivot axis lying in the central plane of the wheel.

On the upper plate of the cap member 30 is attached a hydraulic motor 35 having a flange 36 bolted to the top plate. The housing of the hydraulic motor is thus held stationary relative to the cap member and the hydraulic motor includes a splined shaft 37 projecting downwardly from the underside through the opening 31 in the cap member and into cooperation with the splined bore 29 within the post member. The supply of hydraulic fluid to the motor 35 by control lines (not shown) thus acts to rotate the inner member and therefore the wheel about the vertical axis of the post member with the post member rotating within the cap member relative to the bearing surfaces defined by the post member and the cap member. Alignment of the steering can thus be simply by adjusting the hydraulic motor by supply of fluid rather than by complex mechanical adjustments in a conventional arrangement.

Upon the platform 24 at the top of the inner member is mounted a further post 38 which projects downwardly toward the post member 26 and has an axis lying coaxially with the axis of the post member 26. Onto the post member 38 is attached a further cap member 39 which has the form of a sleeve with a closed lower end allowing the cap member 39 to rotate around the post member 38 but held in position thereon. The cap member 39 similarly includes a pair of pins 40 and 41 projecting outwardly to the sides thereof for cooperation with a clevis 42 at the upper end of a cylinder and piston assembly 43 forming part of the suspension arm 11.

The suspension arm 11 is formed by a pair of side rails 45 and 46 connected by cross members 47 thus forming a rigid three dimensional structure held against twisting and allowing pivotal movement of the inner member relative to the outer end 34 and pivotal movement of the suspension arm relative to a pin 48 provided on the frame member 12. The suspension arm thus holds the pin 48 parallel to the axis of the pins 32 and 33 with the direction of the axis being parallel to the direction of movement of the vehicle. The suspension arm further includes a bell crank section 50 coupled to a conventional resilient suspension system 51 including a spring and shock absorber so that the suspension arm can pivot in a clockwise direction as shown in FIG. 1 under forces from a changing ground height against a spring resistance provided by the suspension system 51.

The suspension arm further includes the cylinder and piston assembly 43 together with a further cylinder and piston assembly 52. Each of the cylinders is coupled at its lower end to the suspension arm. The upper or piston rod end of the cylinder 52 is coupled to a suitable portion of the frame indicated at 12A which is rigidly connected to the frame 12 and thus holds the inner end of the piston rod in fixed location. The piston rod end of the cylinder 43 carries the clevis 42 which is coupled to the pins of the upper cap member. Fluid connections 54 are provided between the cylinders so that any fluid forced out of one of the cylinders 43, 45 by movement of the suspension arm is injected into the other cylinder 43, 45 as best shown in FIG. 1 thus moving the piston rod in the cylinder and acting to maintain the upper cap member and upper post member directly vertically above the lower cap member and lower post member to hold the plane of the wheel vertical and properly stabilized.

The clevis 42 includes rubber bushings 42A allowing a slight amount of play between the clevis and the pins 40, 41 so that the central plane of the wheel can twist slightly from the vertical due to changes to in camber of the road surface on which the wheel is running to tend to maintain the central plane of the wheel as far as possible at right angles to the ground surface. However within these limitations, the central plane of the wheel is maintained generally vertical at all times regardless of the position of the suspension arm due to the cooperation between the suspension arm and the linkage defined by the cylinders 43 and 45. In addition the position of the coupling between the outer end of the suspension arm and the inner member directly on the central plane of the wheel and below the central axis of the wheel provides a stable structure in which there is no cantilever effect and in which the central plane of the wheel can be maintained generally vertical.

A drive system for providing drive to the wheel is omitted from FIGS. 2 and 4 for convenience of illustration. In FIG. 1 and in FIG. 3 are shown two alternative arrangements for communicating drive from a suitable drive system to the rim member 14.

As best shown in FIG. 3, there is provided a disc 60 which is coupled at its outer periphery to the outside edge of the rim member 14 by bolts 61 extending into openings 62 in the outside surface of the rim member. The disc which may be a complete disc or may have portions cut out for reduction in weight thus forming a spider which extends from the periphery to a central boss 63 projecting through a hole 64 in the outer plate 17 of the inner member. The boss 63 in the arrangement shown in FIG. 3 can be directly coupled to a mechanical drive arm and universal joint arrangement (not shown) extending from a main power unit of the vehicle. The drive to the wheel thus passes through the open face 18 of the hollow inner member, past the suspension system and steering system to the boss 63 and from there communicates the drive around the outside of the wheel and particularly the inner member of the wheel to the rim member.

In the arrangement shown in FIG. 1, in place of the mechanical drive linkage and boss is provided a hydraulic drive assembly generally indicated at 65 having a housing mounted upon the end plate 17 and a drive shaft extending through the opening 64 in the end plate 17 and communicating with the disc 60.

Turning now to FIG. 5 there is shown a side elevational view of an inner member 15A suitable for a wheel which is a non steering wheel. It is as a non powered wheel but may include a drive system similar to that described above. In this case the inner member 15A includes two pins 70 and 71 mounted on the inside surface of the inner member and defining a horizontal axis transversely of the inner member at substantially the same height as the axis defined by the pins 32 and 33 in the embodiment previously described. In this case the suspension arm is indicated at 11A and is modified so that it cooperates with the pin 70 and 71 in the pivotal action substantially as previously described. A top pin and cap member 39 identical to that shown in the first embodiment are also provided for cooperation with the outer end of the cylinder 43 as previously described but not shown for convenience in FIG. 5.

The embodiment described above has the following advantages:

1. The point of engagement between the suspension arm and the wheel is positioned right in the centre of the wheel or on the central plane of the wheel so that there is no cantilever effect.

2. The construction is relatively simple and includes less parts and particularly no ball joints which are a particular problem in conventional suspension and steering systems.

3. The wheel is in constant position regardless of the orientation of the suspension arm and therefore there is no disturbance of the geometry including the camber, castor and toe in which arise in conventional steering and suspension systems.

4. The tire periphery is retained continuously horizontal and accordingly provides constant traction regardless of interference from changes in the level of the road surface.

5. The system accomodates a full independant suspension without the necessity to stabilize wheels by tie bars which increase the unsuspended mass.

6. The constant location of the tire relative to the ground prevents or reduces the amount of wear of the tires.

7. The absence of twisting of the tires with the ground allows the use of very low profile tires which reduce rolling friction and reduce unsuspended mass. It may be possible to use solid tires in view of the very much reduced requirement for flexure of the tire surface.

8. In view of the very low number of parts, the system is highly reliable with reduced requirement for maintenance.

9. The system does not require highly complex alignment techniques to set the various angles of the wheels required for conventional suspension systems.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A vehicle suspension system comprising a vehicle frame member, a ground wheel having a peripherally extending ground engaging tire for engaging a road surface, a wheel rim member on which the tire is mounted for rotation about a generally horizontal axis of the wheel and defining a generally vertical central plane of the wheel lying radial to the wheel axis and substantially midway across the width of the tire, an inner member, bearing means mounting the rim member on the inner member for rotation relative thereto about the wheel axis, a suspension arm, pivot mounting means pivotally mounting the suspension arm on the frame member for pivotal movement about a horizontal axis allowing vertical movement of the ground wheel relative to the frame member, resilient suspension means resiliently supporting the suspension arm against vertical movement in an upward direction and coupling means coupling an outer end of the suspension arm to the inner member, said coupling means holding said inner member against rotation around the wheel axis, said coupling means and said inner member defining a pivot axis for pivotal movement of the suspension arm relative to the inner member, said pivot axis being horizontal and lying in said central plane, said coupling means being located below the wheel axis, and linkage means connected between said inner member and said frame member for controlling the orientation of the central plane of the ground wheel relative to the frame, said linkage means including means allowing limited pivotal movement of said inner member relative to said suspension arm to allow limited pivotal movement of said central plane relative to the frame to automatically accommodate changes in angle of the road surface relative to the frame and to automatically tend to maintain said central plane art right angles to the road surface.

2. A suspension system according to claim 1 wherein the linkage means comprises a first cylinder and piston assembly having one end connected to the arm and an opposed end connected to the frame member and a second cylinder and piston assembly having one end connected to the suspension arm and an opposed end connected to the inner member and means for communicating fluid expelled from the first cylinder to the second cylinder and for communicating fluid expelled from the second cylinder to the first cylinder.

3. A suspension system according to claim 1 wherein the inner member comprises a substantially cylindrical wall coaxially surrounding the wheel axis and located radially inwardly of and supporting the wheel rim, bearing means positioned radially outwardly of the cylindrical wall between the cylindrical wall and the wheel rim, the cylindrical wall surrounding the coupling means.

4. A suspension system according to claim 3 wherein an outer surface of the cylindrical wall is defined by a central cylindrical section and two frusto conical sections each arranged on a respective side of the central section and extending from the central section radially outwardly to a widest portion of the outer surface at side edges of the wheel rim.

5. A suspension system according to claim 4 wherein the frusto conical section at an outer side of the wheel is formed as a separate section which can be removed to allow axial movement of the wheel rim for removal from the inner member.

6. A suspension system according to claim 3 wherein one axial end face of the inner member through which the arm passes is open.

7. A suspension system according to claim 6 including drive coupling means extending through the open end face and passing through an axial opening in an opposed end of the inner member and means for communicating drive from the drive coupling means extending outwardly from the axial opening to a connection with the rim member outwardly of the inner member on the side of the wheel remote from the suspension arm.

8. A suspension system according to claim 1 including steering pivot means defining a vertical steering axis lying substantially in said central plane substantially at right angles to said pivot axis.

9. A suspension system according to claim 8 wherein the steering pivot means is mounted on said coupling means.

10. A suspension system according to claim 9 wherein the steering pivot means includes motor means drivable to rotate the inner member about said vertical steering axis.

11. A suspension system according to claim 10 wherein the inner member includes a post member connected to a lower portion thereof and standing upwardly therefrom so as to define said substantially vertical steering axis, said post member having a cylindrical peripheral surface, a cap member positioned on the post member and having an inner surface cooperable with the cylindrical surface of the post member for rotation of the cap member about said vertical steering axis, said cap member having a pair of coupling portions extending outwardly from the sides thereof for connection to said suspension arm, said coupling portions allowing rotation of the suspension arm about said horizontal pivot axis, and a hydraulic motor mounted upon the cap member and having a shaft extending through the cap member in a vertical direction into the post member for drivingly rotating the post member relative to the cap member about said vertical steering axis.

12. A vehicle suspension system comprising a vehicle frame member, a ground wheel having a peripherally extending ground engaging tire, a wheel rim member on which the tire is mounted for rotation about a substantially horizontal axis of the wheel, an inner member, bearing means mounting the rim member on the inner member for rotation relative thereto about the wheel axis, a suspension arm, means pivotally mounting the suspension arm on the frame member for pivotal movement about a horizontal axis allowing vertical movement of the ground wheel relative to the frame member, resilient suspension means resiliently supporting the suspension arm against vertical movement in an upward direction and coupling means coupling an outer end of the suspension arm to the inner member, said coupling means holding said inner member against rotation around the wheel axis, wherein the inner member comprises a substantially cylindrical wall coaxially surrounding the wheel axis and located radially inwardly of an supporting the wheel rim, bearing means positioned radially outwardly of the cylindrical wall between the cylindrical wall and the wheel rim, the cylindrical wall surrounding the coupling means, said coupling means and said inner member defining a pivot axis for pivotal movement of the suspension arm relative to the inner member, said pivot axis being horizontal and lying within said cylindrical wall.

13. A suspension system according to claim 12 including drive coupling means extending through the open end face and passing through an axial opening in an opposed end of the inner member and means for communicating drive from the drive coupling means extending outwardly from the axial opening to a connection with the rim member radially outwardly of the inner member on the side of the wheel remote from the suspension arm.

14. A suspension system according to claim 12 including steering pivot means defining a vertical steering axis lying within said cylindrical wall substantially at right angles to said pivot axis.

15. A suspension system according to claim 14 wherein the steering pivot means is mounted on said coupling means.

16. A suspension system according to claim 15 wherein the steering pivot means includes motor means drivable to rotate the inner member about said vertical steering axis.

17. A suspension system according to claim 16 wherein the inner member includes a post member connected to a lower portion thereof and standing upwardly therefrom so as to define said substantially vertical steering axis, said post member having a cylindrical peripheral surface, a cap member positioned on the post member and having an inner surface cooperable with the cylindrical surface of the post member for rotation of the cap member about said vertical steering axis, said cap member having a pair of coupling portions extending outwardly from the sides thereof for connection to said suspension arm, said coupling portions allowing rotation of the suspension arm about said horizontal pivot axis, and a hydraulic motor mounted upon the cap member and having a shaft extending through the cap member in a vertical direction into the post member for drivingly rotating the post member relative to the cap member about said vertical steering axis.

18. A vehicle suspension system comprising a vehicle frame member, a ground wheel having a peripherally extending ground engaging tire for engaging a road surface, a wheel rim member on which the tire is mounted for rotation about a generally horizontal axis of the wheel and defining a generally vertical central plane of the wheel lying radial to the wheel axis and substantially midway across the width of the tire, an inner member, bearing means mounting the rim member on the inner member for rotation relative thereto about the wheel axis, a suspension arm, pivot mounting means pivotally mounting the suspension arm on the frame member for pivotal movement about a horizontal axis allowing vertical movement of the ground wheel relative to the frame member, resilient suspension means resiliently supporting the suspension arm against vertical movement in an upward direction and coupling means coupling an outer end of the suspension arm to the inner member, said coupling means holding said inner member against rotation around the wheel axis, said coupling means and said inner member defining a pivot axis for pivotal movement of the suspension arm relative to the inner member, said pivot axis being horizontal and lying in said central plane and steering pivot means mounted on said coupling means and defining a vertical steering axis of the wheel lying substantially in said central plane substantially at right angles to said pivot axis and including motor means drivable to rotate the inner member relative to said coupling means in a steering action about said vertical steering axis.

19. A suspension system according to claim 18 wherein the inner member includes a post member connected to a lower portion thereof and standing upwardly therefrom so as to define said substantially vertical steering axis, said post member having a cylindrical peripheral surface, a cap member positioned on the post member and having an inner surface cooperable with the cylindrical surface of the post member for rotation of the cap member about said vertical steering axis, said cap member having a pair of coupling portions extending outwardly from the sides thereof for connection to said suspension arm, said coupling portions allowing rotation of the suspension arm about said horizontal pivot axis, and a hydraulic motor mounted upon the cap member and having a shaft extending through the cap member in a vertical direction into the post member for drivingly rotating the post member relative to the cap member about said vertical steering axis.

* * * * *